United States Patent
Chu et al.

(10) Patent No.: US 11,229,940 B2
(45) Date of Patent: Jan. 25, 2022

(54) METHOD FOR MANUFACTURING COMBINED HOLLOW CAMSHAFT BY AXIAL-COMPRESSION UPSETTING-DEFORMATION TECHNIQUE

(71) Applicants: Harbin Institute of Technology, Weihai, Shandong (CN); Guannan Chu, Shandong (CN)

(72) Inventors: Guannan Chu, Shandong (CN); Lei Sun, Shandong (CN)

(73) Assignees: Guannan Chu, Shandong (CN); HARBIN INSTITUTE OF TECHNOLOGY, WEIHAI, Shandong (CN)

( * ) Notice: Subject to any disclaimer, the term of this patent is extended or adjusted under 35 U.S.C. 154(b) by 28 days.

(21) Appl. No.: 16/891,731

(22) Filed: Jun. 3, 2020

(65) Prior Publication Data

US 2021/0323042 A1    Oct. 21, 2021

(30) Foreign Application Priority Data

Apr. 15, 2020    (CN) .......................... 202010298280.4

(51) Int. Cl.
*B21D 26/033*    (2011.01)
*B21D 53/84*    (2006.01)

(52) U.S. Cl.
CPC .......... *B21D 26/033* (2013.01); *B21D 53/845* (2013.01); *B23P 2700/02* (2013.01)

(58) Field of Classification Search
CPC . B21D 26/033; B21D 53/845; B23P 2700/02; F16D 1/068; F16H 53/025; F01L 1/047; F01L 1/08; Y10T 74/2101; Y10T 29/49293
See application file for complete search history.

(56) References Cited

U.S. PATENT DOCUMENTS

| 4,620,356 A | * | 11/1986 | Maus | ................. F16H 57/0025 29/432 |
| 7,020,962 B2 | * | 4/2006 | Merz | .................... B21D 53/845 123/90.6 |
| 2015/0231685 A1 | * | 8/2015 | Colosseo | ............. B21D 26/033 29/888.1 |

* cited by examiner

*Primary Examiner* — Lee A Holly
(74) *Attorney, Agent, or Firm* — Hoffmann & Baron, LLP

(57) ABSTRACT

A method for manufacturing a hollow camshaft is provided, and more particularly, a method for manufacturing a combined hollow camshaft by an axial-compression upsetting-deformation technique. The present method solves a problem that the current camshaft manufactured in an internal high-pressure expansion manner in the prior art has the insufficient locking force to cause the loosening of a cam. The method is as follows: a camshaft is formed by combining two independent units, namely a cam and a shaft tube. Non-circular countersinks are distributed on two sides of the cam. Thrust steps are formed on the shaft tube correspondingly. The cam is placed between the two thrust steps of the shaft tube. The locking force is applied to the cam by utilizing the thrust steps on the two sides of the cam based on thermal expansion and contraction. Simultaneously, the thrust steps lock the cam with the countersinks.

12 Claims, 3 Drawing Sheets

METHOD FOR MANUFACTURING COMBINED HOLLOW CAMSHAFT BY AXIAL-COMPRESSION UPSETTING-DEFORMATION TECHNIQUE

CROSS-REFERENCE TO RELATED APPLICATIONS

This application claims priority to Chinese Patent Application No. 202010298280.4, filed on Apr. 15, 2020, the disclosure of which is incorporated by reference herein in its entirety for all purposes.

TECHNICAL FIELD

The present invention relates generally to a forming method in the field of industrial manufacturing technologies, and in particular to a method for manufacturing a combined hollow camshaft by an axial-compression upsetting-deformation technique.

BACKGROUND

A camshaft is a key part of the engine to control valves to open or close. The camshaft has a through-hole in the axial direction to convey a lubricant for achieving cooling and lubricating functions. The earliest manufacturing method of the camshaft is to integrally cast or forge a preformed billet, then secondarily process the preformed billet to obtain each working surface and axial hole. A difficulty is to process an axial through-hole. The axial through-hole can be manufactured only by using a deep hole drill to drill, but there is a problem that it is easy to generate "deviation" or "drill bit breakage" during drilling of the deep hole drill, thereby causing high technical difficulty and low yield.

To avoid the difficulty of processing the through-hole, techniques of hydraulic expansion, interference fit and the like are developed later to manufacture the camshaft. The process of a deep hole is avoided. However, in practical application, a camshaft manufactured by the hydraulic expansion is easy to drop out after undergoing thermal cycle, so there is a security risk. A camshaft manufactured by the interference fit is hard to overcome problems of narrow process window, high rejection rate, high costs and the like.

SUMMARY

To solve the above problems, the present invention proposes a new method for manufacturing a combined hollow camshaft by an axial-compression upsetting-deformation technique.

In accordance with an embodiment of the invention, a method of forming a single camshaft is provided. The structure of the single camshaft is as follows: in a camshaft, two independent units, namely a cam and a shaft tube, are combined to form working surfaces and through holes as required. A combination manner of the two units is as follows: first, a first countersink and a second countersink are distributed on two sides of the cam. The bottom surface of the first countersink and the bottom surface of the second countersink may be flat surfaces, inclined surfaces or male and female surfaces, preferably the inclined surfaces. The cross sections of the first countersink and the second countersink are non-circular or circular. The first countersink and the second countersink match with a first step and a second step to lock a translational degree of freedom and a circumferential rotational degree of freedom of the cam. Second, the shaft tube is a hollow tube with the first thrust step and the second thrust step. The cam is displaced between the first thrust step and the second thrust step of the shaft tube. Then, the cam is locked by the compression force of the first thrust step and the cam and the compression force of the second thrust step and the cam.

A method for manufacturing a combined hollow camshaft by an axial-compression upsetting-deformation technique according to an embodiment of the invention comprises the following steps:

Step 1: selecting a tube billet, wherein the inner diameter of the tube billet is as same as the inner diameter of the shaft tube, the outer diameter of the tube billet is slightly larger than the outer diameter of the shaft tube, and specifically the outer diameter of the tube billet is 1.0-1.2 times of the outer diameter of the shaft tube; selecting a cam, wherein the inner diameter of the cam is slightly larger than the outer diameter of the tube billet, and specifically the inner diameter of the cam is 1.0-1.2 times of the outer diameter of the tube billet; the outer contour of a selected cam blank is slightly larger than the outer contour of a fine-processed cam, and specifically, the shape error is less than 2 mm;

Step 2: heating a region A of the tube billet, wherein the axial width of the region A is 1-2 times of the axial width of the cam;

Step 3: stopping heating when the temperature of the region A is up in the range of 50-1400 DEG C.;

Step 4: placing the cam in the region A;

Step 5: applying a support inner pressure p to an inner cavity of the tube billet;

Step 6: compressing the tube billet in the axial direction, wherein the temperature of the region A is high, so the material of the region A is thickened and deformed in an upsetting manner and also fills the first countersink and the second countersink of the cam; stopping compressing when the first thrust step and the second thrust step are formed, wherein Step 3 to Step 6 should be finished within 60 s;

Step 7: locking the cam, wherein with the temperature reducing, the material of the region A is shrunk in the axial and radial directions to generate the compression force between the first thrust step and the bottom surface of the first countersink as well as between the second thrust step and the bottom surface of the second countersink, so the cam is locked.

Step 8: the shaft tube and the outer contour of the cam are fine processed, which is as same as the prior art.

Further, the support inner pressure p is zero (0), and the other steps are the same.

Further, the support inner pressure p is in the range of 0.1-500 MPa, and the other steps are the same.

Further, the non-circular shapes of the cross sections of the first countersink and the second countersink distributed on the two sides of the cam are polygon, and the other steps are the same.

Specifically, another embodiment of the invention is characterized in that: a camshaft combiner is formed based on the first invention. The assembly and manufacture of a second cam can be completed by repeating Step 1 to Step 5; or two or more cams can also be manufactured according to Step 1 and Step 5 at the same time; by that analogy, the method can manufacture any amount and shape of the camshaft as required.

Compared with the prior art, the present invention has the following beneficial effects: 1, the cam and the shaft tube are independent units and can be made from different materials to achieve the best match of their performances and costs; 2, the tube billet is utilized to manufacture the shaft tube such that it does not need to drill a hole; 3, the locking force is formed by utilizing thermal expansion and contraction during camshaft formation, which is easy to implement and achieve; 4, the local part is heated and then upset to form the thrust step, which is simple and easy to achieve; 5, the circumferential and axial degrees of freedom of the cam are commonly limited by the thrust steps, the axial locking force and the countersinks of the non-circular cross sections, which is reliable and is easy to implement.

Figure 1:
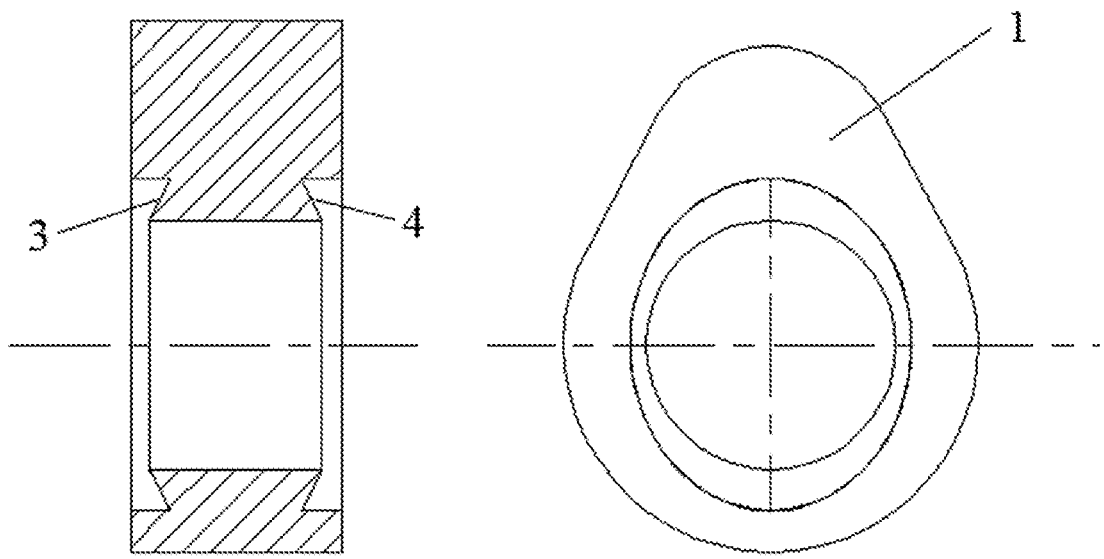
FIG. 1 is a schematic diagram of a cam.
Figure 2:
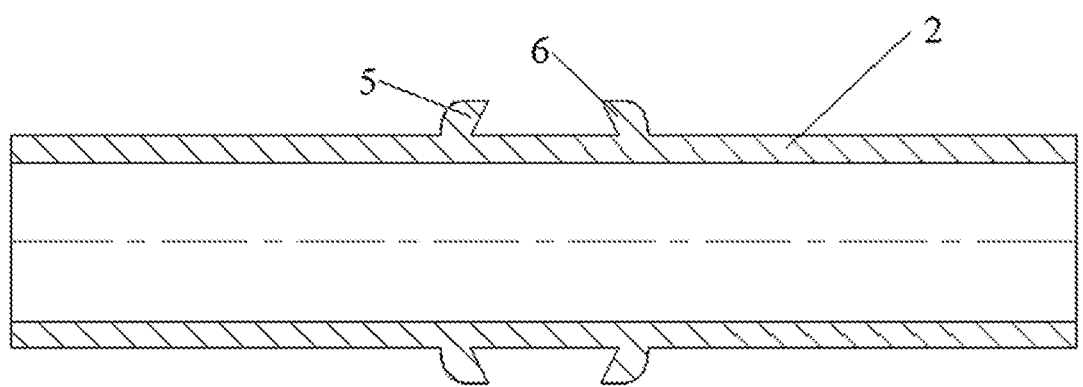
FIG. 2 is a schematic diagram of a shaft tube and thrust steps.
Figure 3:
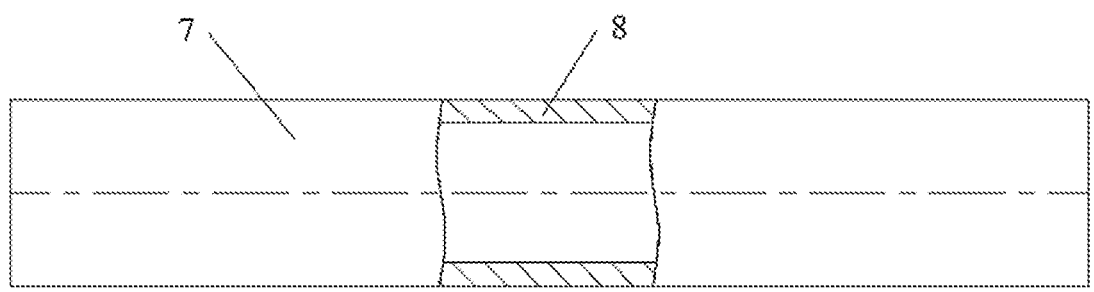
FIG. 3 is a schematic diagram of a region A of a tube billet.
Figure 4:
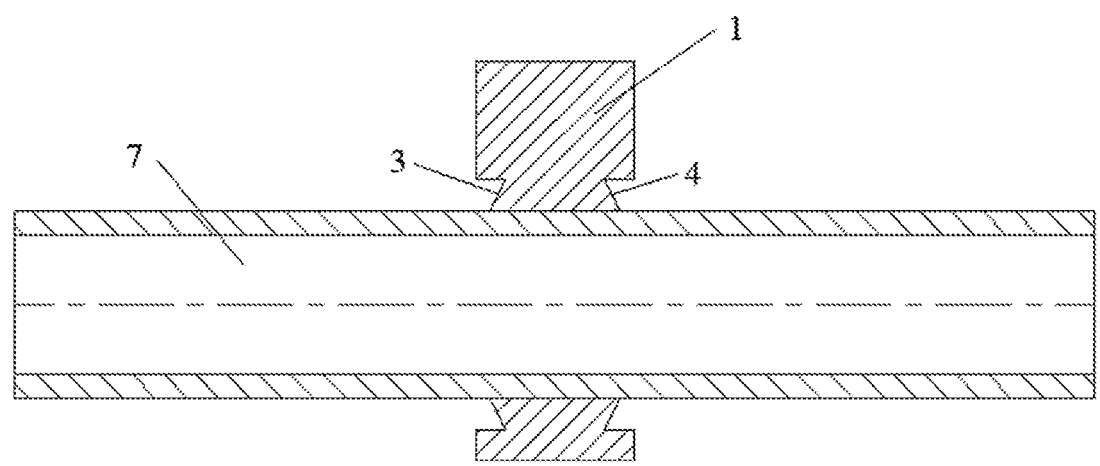
FIG. 4 is a schematic diagram of a cam placed at the middle portion of a region A.
Figure 5:
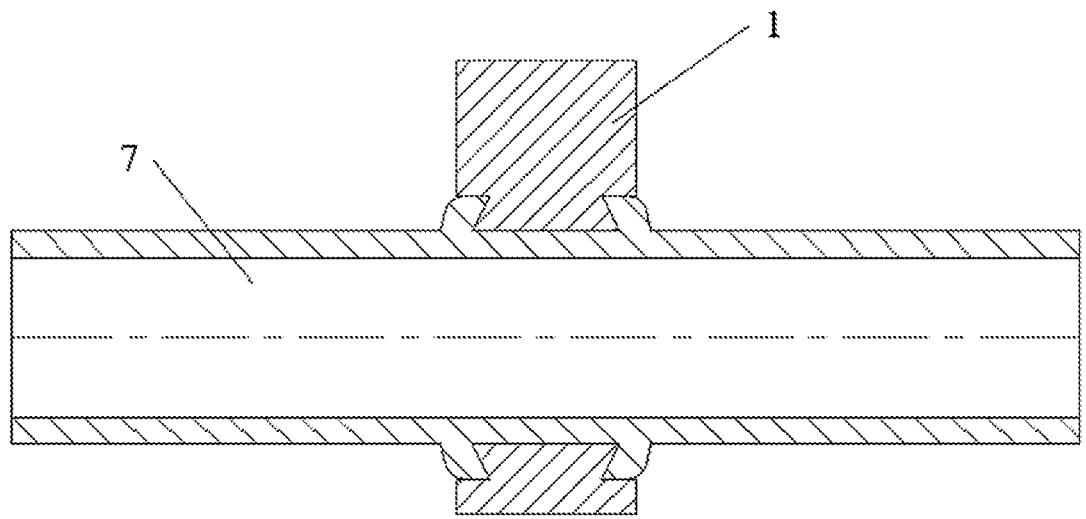
FIG. 5 is a schematic diagram of a hollow camshaft finished product.

In the drawings: 1—cam, 2—shaft tube, 3—first countersink, 4—second countersink, 5—first thrust step, 6—second thrust step, 7—tube billet, 8—region A, and 9—second cam.

DETAILED DESCRIPTION

As shown in FIG. 1, FIG. 2, FIG. 3, FIG. 4 and FIG. 5, the present invention will be further described in detail with reference to the accompanying drawings and specific embodiments.

Specific embodiment I: the first invention of the method is a single camshaft. The structure of the single camshaft is as follows: in a camshaft, two independent units, namely a cam (1) and a shaft tube (2), are combined to form working surfaces and through holes as required. A combination manner of the two units is as follows: first, a first countersink (3) and a second countersink (4) are distributed on two sides of the cam (1). The bottom surface of the first countersink (3) and the bottom surface of the second countersink (4) may be flat surfaces, inclined surfaces or male and female surfaces. The cross sections of the first countersink (3) and the second countersink (4) are non-circular or circular. The first countersink and the second countersink match with a first step (5) and a second step (6) to lock a translational degree of freedom and a circumferential rotational degree of freedom of the cam. Second, the shaft tube is a hollow tube with the first thrust step (5) and the second thrust step (6). Then, the cam (1) is displaced between the first thrust step (5) and the second thrust step (6) of the shaft tube. The cam is locked by the compression force of the first thrust step (5) and the cam and the compression force of the second thrust step (6) and the cam. A method for manufacturing a combined hollow camshaft by an axial-compression upsetting-deformation technique is characterized by comprising the following steps:

Step 1: selecting a tube billet (7), wherein the inner diameter of the tube billet (7) is as same as the inner diameter of the shaft tube (2), the outer diameter of the tube billet (7) is slightly larger than the outer diameter of the shaft tube (2), and specifically the outer diameter of the tube billet (7) is 1.0-1.2 times of the outer diameter of the shaft tube (2);

selecting a cam (1), wherein the inner diameter of the cam (1) is slightly larger than the outer diameter of the tube billet (7), and specifically the inner diameter of the cam (1) is 1.0-1.2 times of the outer diameter of the tube billet (7); the outer contour of a selected cam blank (1) is slightly larger than the outer contour of a fine-processed cam (1), and specifically, the shape error is less than 2 mm;

Step 2: heating a region A (8) of the tube billet (7), wherein the axial width of the region A (8) is 1-2 times of the axial width of the cam;

Step 3: stopping heating when the temperature of the region A (8) is up in the range of 50-1400 DEG C.;

Step 4: placing the cam (1) in the region A (8);

Step 5: applying a support inner pressure p to an inner cavity of the tube billet (7);

Step 6: compressing the tube billet (7) in the axial direction, wherein the temperature of the region A is high, so the material of the region A is thickened and deformed in an upsetting manner and also fills the first countersink (3) and the second countersink (4) of the cam; stopping compressing when the first thrust step (5) and the second thrust step (6) are formed, wherein Step 3 to Step 6 should be finished within 60 s;

Step 7: locking the cam (1), wherein with the temperature reducing, the material of the region A (8) is shrunk in the axial and radial directions to generate the compression force between the first thrust step (5) and the bottom surface of the first countersink (3) as well as between the second thrust step (6) and the bottom surface of the second countersink (4), so the cam is locked.

Step 8: fine processing the shaft tube (7) and the outer contour of the cam (1), which is as same as the prior art.

Specific embodiment II: the pressure p in the embodiment is zero (0), and the other steps are the same as those in specific embodiment I.

Specific embodiment III: the pressure p in the embodiment is in the range of 0.1-500 MPa. and the other steps are the same as those in specific embodiment I.

Specific embodiment IV: the non-circular shapes of the cross sections of the first countersink (3) and the second countersink (4) in the embodiment are polygon, and the other steps are the same as those in specific embodiment I.

Figure 6:
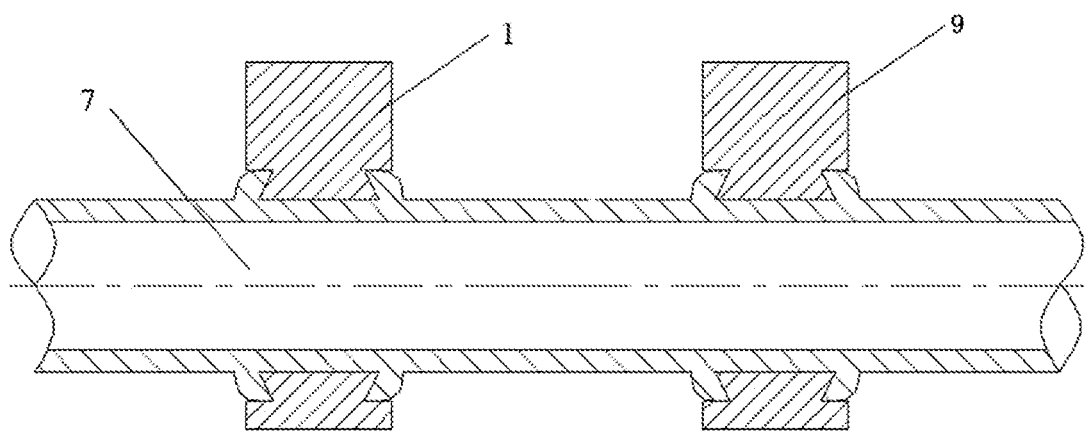
FIG. 6 is a schematic diagram showing assembly of multiple cams.

As shown in FIG. 6, a method for processing double camshafts is as follows: the assembly and manufacture of a second cam (9) can be completed by repeating Step 1 to Step 5; or two or more cams can also be manufactured according to Step 1 and Step 5 at the same time; by that analogy, the method can manufacture any amount and shape of the camshaft as required.

The above description is not intended to limit the present invention, and the present invention is not limited to the above embodiments. Changes, modifications, additions or replacements made by a person skilled in the art within the essential range of the present invention should fall within the protection scope of the present invention.

What is claimed is:

1. A method for manufacturing a combined hollow camshaft by an axial-compression upsetting-deformation technique, the combined hollow camshaft being formed by combining a cam and a shaft tube to form working surfaces and through-holes, the cam including first and second countersinks distributed on two sides of the cam, the first countersink and the second countersink matching with a first thrust step and a second thrust step to lock a translational degree of freedom and a circumferential rotational degree of freedom of the cam, the shaft tube being a hollow tube with the first thrust step and the second thrust step, the cam being displaced between the first thrust step and the second thrust step of the shaft tube, the cam being locked by the compression force of the first thrust step and the cam and the compression force of the second thrust step and the cam;

the method comprising:

selecting a tube billet, wherein an inner diameter of the tube billet is the same as an inner diameter of the shaft tube, and an outer diameter of the tube billet is larger than an outer diameter of the shaft tube;

selecting a cam billet, wherein an inner diameter of the cam billet is larger than an outer diameter of the tube billet;

heating a region A of the tube billet, wherein an axial width of the region A is 1-2 times an axial width of the cam billet;

stopping heating when a temperature of the region A of the tube billet is in a range of 50-1400 degrees Celsius;

placing the cam billet in the region A of the tube billet;

applying a support inner pressure p to an inner cavity of the tube billet;

compressing the tube billet in an axial direction, wherein the temperature of the region A of the tube billet is sufficiently high so that the material of the region A is thickened and deformed in an upsetting manner and also fills the first countersink and the second countersink of the cam billet;

stopping compressing when the first thrust step and the second thrust step are formed;

locking the cam billet, wherein as the temperature of the region A is reducing, the material of the region A shrinks in axial and radial directions to generate a compression force between the first thrust step and the bottom surface of the first countersink, as well as between the second thrust step and the bottom surface of the second countersink, to thereby lock the cam billet; and fine processing outer contours of the tube billet compressed and the cam billet to obtain the combined hollow camshaft.

2. The method according to claim 1, further comprising forming a double camshaft by assembling a second cam comprising:

selecting a second tube billet;
selecting a second cam billet;
heating a region A of the second tube billet;
stopping heating when a temperature of the region A of the second tube billet is in a range of 50-1400 degrees Celsius;
placing the second cam billet in the region A of the second tube billet; and
applying a support inner pressure p to an inner cavity of the second tube billet.

3. The method according to claim 2, wherein in forming the two cams of the double camshaft, the steps of selecting the tube billet and cam billet, and applying the support inner pressure are performed concurrently.

4. The method according to claim 1, wherein the pressure p is in a range of 0.1-500 MPa.

5. The method according to claim 1, wherein the pressure p is 0.

6. The method according to claim 1, wherein non-circular shapes of the cross sections of the first countersink (3) and the second countersink (4) are polygon.

7. The method according to claim 1, wherein a bottom surface of the first and second countersinks is one of a flat surface, an inclined surface, a male surface, and a female surface.

8. The method according to claim 1, wherein a cross section of each of the first and second countersinks is one of non-circular and circular.

9. The method according to claim 1, wherein the outer diameter of the tube billet is 1.0 to 1.2 times the outer diameter of the shaft tube.

10. The method according to claim 1, wherein the inner diameter of the cam billet is 1.0 to 1.2 times the outer diameter of the tube billet.

11. The method according to claim 1, wherein the steps of stopping heating of the region A, placing the cam billet in the region A, applying the support inner pressure p to an inner cavity of the tube billet, compressing the tube billet, and stopping compressing are completed within 60 seconds.

12. A method for manufacturing a combined hollow single camshaft by an axial-compression upsetting-deformation technique, the single camshaft including a cam and a shaft tube, the cam and shaft tube being independent units that are combined to form working surfaces and through holes, a combination of the cam and shaft tube including a first countersink and a second countersink distributed on two sides of the cam, a bottom surface of the first countersink and a bottom surface of the second countersink being one of flat surfaces, inclined surfaces, and male and female surfaces, cross sections of each of the first and second countersinks being one of non-circular and circular, the first countersink and the second countersink matching with a first thrust step and a second thrust step, respectively, to lock a translational degree of freedom and a circumferential rotational degree of freedom of the cam, the shaft tube being a hollow tube with the first thrust step and the second thrust step, the cam being displaced between the first thrust step and the second thrust step of the shaft tube, the cam being locked by a compression force of the first thrust step and the cam, and the compression force of the second thrust step and the cam, the method comprising:

selecting a tube billet, wherein an inner diameter of the tube billet is the same as an inner diameter of the shaft tube, an outer diameter of the tube billet is larger than an outer diameter of the shaft tube;

selecting a cam billet, wherein an inner diameter of the cam billet is larger than the outer diameter of the tube billet, an outer contour of the cam billet selected being larger than an outer contour of a fine-processed cam;

heating a region A of the tube billet, wherein an axial width of the region A is 1-2 times an axial width of the cam billet;

stopping heating when a temperature of the region A is in a range of 50-1400 degrees Celsius;

placing the cam billet in the region A;

applying a support inner pressure p to an inner cavity of the tube billet;

compressing the tube billet in an axial direction, wherein the temperature of the region A is high such that a material of the region A is thickened and deformed in an upsetting manner and also fills the first countersink and the second countersink of the cam billet;

stopping compressing when the first thrust step and the second thrust step are formed;

locking the cam billet, wherein with the temperature of the region A reducing, the material of the region A is shrunk in the axial and radial directions to generate a compression force between the first thrust step and the bottom surface of the first countersink, as well as between the second thrust step and the bottom surface of the second countersink, so that the cam billet is locked; and fine processing outer contours of the tube billet compressed and the cam billet to obtain the single camshaft.

\* \* \* \* \*